United States Patent [19]

Sismour, Jr.

[11] Patent Number: 4,908,537
[45] Date of Patent: Mar. 13, 1990

[54] POLE VENTILATION OF RADIALLY VENTILATED ROTORS

[75] Inventor: Albert C. Sismour, Jr., Casselberry, Fla.

[73] Assignee: Westinghouse Electric Corp., Pittsburgh, Pa.

[21] Appl. No.: 186,868

[22] Filed: Apr. 27, 1988

[51] Int. Cl.[4] .............................................. H02K 1/32
[52] U.S. Cl. ...................... 310/51; 310/215; 310/61
[58] Field of Search ...................... 310/51, 61, 64, 65, 310/214, 215

[56] References Cited

U.S. PATENT DOCUMENTS 3,163,789 12/1964 Rosenberg ............................ 310/53
4,508,985 4/1985 Pavlik et al. ........................ 310/55
4,547,688 10/1985 Hammer et al. .................... 310/59

Primary Examiner—Patrtick R. Salce
Assistant Examiner—Judson H. Jones
Attorney, Agent, or Firm—W. A. Elchik

[57] ABSTRACT

Methods and apparatus for reducing noise in a radially ventilated rotor of a dynamoelectric machine are provided by slots formed in the pole regions of the rotor. Members formed of a selected magnetic material, having longitudinally extending ventilating ducts connected with a plurality of ventilating holes, are inserted within each slot and provided with the same flow of cooling fluid which is introduced into the slot contents of the radially ventilated rotor. Thereafter, the flow of fluid through both the slot contents and the pole regions is equalized in order to prevent flow-induced noise.

10 Claims, 1 Drawing Sheet

POLE VENTILATION OF RADIALLY VENTILATED ROTORS

BACKGROUND OF THE INVENTION

1. Field of the Invention:

This invention relates generally to dynamoelectric machines, and more particularly to such machines which have a radially ventilated rotor.

2. Statement of the Prior Art:

It is well known that the conductors forming electrical windings in dynamoelectric machines can be cooled by passing a cooling fluid through the windings, which are contained within longitudinally extending slots that are radially disposed about the periphery of a rotor of the machine, in direct contact with the material of the conductors. One form of cooling common in generators for power station use is radial cooling in which the cooling fluid is caused to flow in a radial direction with respect to the central axis of the generator, through radially disposed ducts formed in the conductors of each slot.

In U.S. Pat. No. 4,508,985, which is assigned to the assignee of the present invention and is incorporated herein by reference, the general characteristics of machines with radial path air-cooled rotors are described as they have been made heretofore, as well as an improvement thereto for providing better flow into the slot channels by means of a channel inlet fairing. This provides better cooling of the rotor so that machine size and noise can be reduced.

In machines with such radial air cooling of the rotor in accordance with the prior art, the air is supplied to the end turn region through a stationary inlet duct that extends substantially radially from the periphery of the machine. The air then flows radially inward from the inlet duct, entering the interior to the retaining ring and field winding end turns and flowing in the axial direction with little or no tangential velocity component. Part of the air flows radially outward, cooling the end turns and exists the retaining ring through ventilation holes. The remaining air passes into the field winding slot channels and hence radially outward through a number of slits in the field winding, cooling the body portion of the winding. The air then exists through radial holes in the rotor wedges and enters the air gap. Air from the body portion of the winding flows axially and circumferentially along the air gap and joins the air from the end turn portion of the winding. This combined exhaust flow then is dumped interior to the machine enclosure and exits through the cooler where heat is removed. The air then continues to recirculate.

In U.S. Pat. No. 4,547,688, which is also assigned to the assignee of the present invention and is incorporated herein by reference, the flow path is improved by modifying the inlet duct configuration to include means for rotationally directing coolant out of said duct in the direction of the rotation of the rotor. This means comprises, for example, a plurality of inlet guide vanes in fixed locations between axially inner and outer walls of the inlet duct. The guide vanes are each member extending substantially the entire distance between the walls of the duct proximate the end of the inlet duct adjacent the end turns. They are on an angle relative to a direct radium from the shaft axis so that their radial lower edge is circumferentially spaced from their upper edge in the direction of rotor rotation. Preferably, each of the inlet guide vanes has an airfoil configuration with smoothly curved major surfaces between their upper and lower edges and those edges are smoothly rounded. The vanes may take other forms so long as they impart a tangential velocity to the coolant as it leaves the inlet duct.

It is also well known, however, that dynamoelectric machines having radially ventilated rotors, such as those machines described above with reference to U.S. Pat. No. 4,508,985 and U.S. Pat. No. 4,547,688, experience a "siren effect" due to the flow noise produced by the fluid flow into the periodic channels. Such a "siren effect" is highly undesirable in circumstances where low noise is of importance, such as in shipboard machines. The apparatus of U.S. Pat. No. 4,547,688 reduces such effects by matching the air tangential speed with the subslot inlet speed in order to reduce chopping of the air by the subslot inlets. Nevertheless, neither the apparatus of U.S. Pat. No. 4,508,985 not the apparatus of U.S. Pat. No. 4,547,668 addresses the problem of flow noise induced by the absence of fluid flow from the pole regions of a rotor.

The cooling paths formed in prior art radially ventilated rotors, as is evident, only provide a flow of the fluid out of the rotor in the vicinity of the slots containing the field winding conductors. In regions about the periphery of the rotor between the field winding conductors, such as in the pole regions of the rotor, substantially no flow is present. Accordingly, a non-uniform flow distribution is set up circumferentially about the periphery of the rotor such that a "flow-no flow" condition exists. This "flow-no flow" condition further leads to the production of undesirable noise components as the non-uniform flow distribution impinges upon the stationary parts of the dynamoelectric machine.

SUMMARY OF THE INVENTION

Accordingly, it is a general object of the present invention to provide a ventilating fluid flow in the regions of the poles of a rotor in a dynamoelectric machine. More specifically, it is an object of the present invention to equalize, or provide a more uniform distribution of the ventilating fluid flow in a radially ventilated rotor.

Another object of the present invention is to provide methods and apparatus for reducing flow-induced noise in radially ventilated rotors.

Still another object of the present invention is to substantially reduce the harmonic components of flow-induced noise in radially ventilated rotors.

A further object of the present invention is to provide methods and apparatus for reducing flow-induced noise in radially ventilated rotors which also reduces the bending stiffness contribution of the pole regions in such two-pole rotors.

Yet a further object of the present invention is to substantially reduce mechanical vibrations caused by the bending stiffness contribution of the pole regions in radially ventilated rotors.

Briefly, the above and other objects according to the present invention are accomplished by providing means for radially ventilating each of the pole regions of the rotor, and by further providing a flow of fluid through the radially ventilating means. In typical dynamoelectric machines of the type having radially ventilated rotors, the rotor comprises an outer body portion having formed therein about its periphery a plurality of longitudinal slots. Each of the longitudinal slots contain an axial ventilating channel and slot contents. The axial ventilating channel may be formed within the rotor body or within the insulated winding components. Typically, the slot contents include a bottom spacer, an insulating slot cell adjacent the surface of the outer body portion and the bottom spacer (if present), a plurality of field winding conductors, a top spacer, and a damper bar. Each of the slot contents further have formed therein a plurality of radial ventilating slots in order to provide cooling paths between the channel and the exterior of the rotor.

In accordance with one important aspect of the present invention, the means for radially ventilating each of the pole regions, which are the otherwise continuous regions about the periphery of the rotor between the field winding conductors, comprise a plurality of slots in the rotor, each of the slots having a predetermined cross-section extending longitudinally with respect to the rotor in a respective one of the pole regions. An insert for each slot formed in the pole regions is also provided, each insert having a cross-section corresponding to the predetermined cross-section, and including means for circulating the flow of fluid therethrough.

In accordance with another important aspect of the present invention, the means for circulating the flow of fluid through each insert comprises a member formed of a preselected magnetic material, a ventilation duct formed within the member extending longitudinally thereof, and a plurality of ventilation holes formed within the member. Each of the plurality of ventilation holes is connected to and extending radially outward from the ventilation duct such that the flow of fluid, for example air, can be drawn from the ventilation duct in each of the pole slots, up through the plurality of ventilation holes, and out through the surface of the rotor. In such a manner, a more uniform flow distribution is achieved and flow noise reduced.

In accordance with yet another important aspect of the present invention, reduction of flow-induced noise can be optimized by selecting the size and spacing of the ventilation holes. A determination of the fluid flow through the radially ventilated rotor is first made, with a distribution of various size ventilation holes and corresponding spacings subsequently being determined. Thereafter, one of the sizes is selected, and the ventilation holes are formed in the pole regions of the rotor spaced one from the other along one of the inserts by the spacing which corresponds to the selected size.

Other objects, advantages and novel features according to the present invention will become more apparent from the following detailed description thereof, when considered in conjunction with the accompanying drawings wherein:

DETAILED DESCRIPTION OF THE INVENTION

Figure 1:
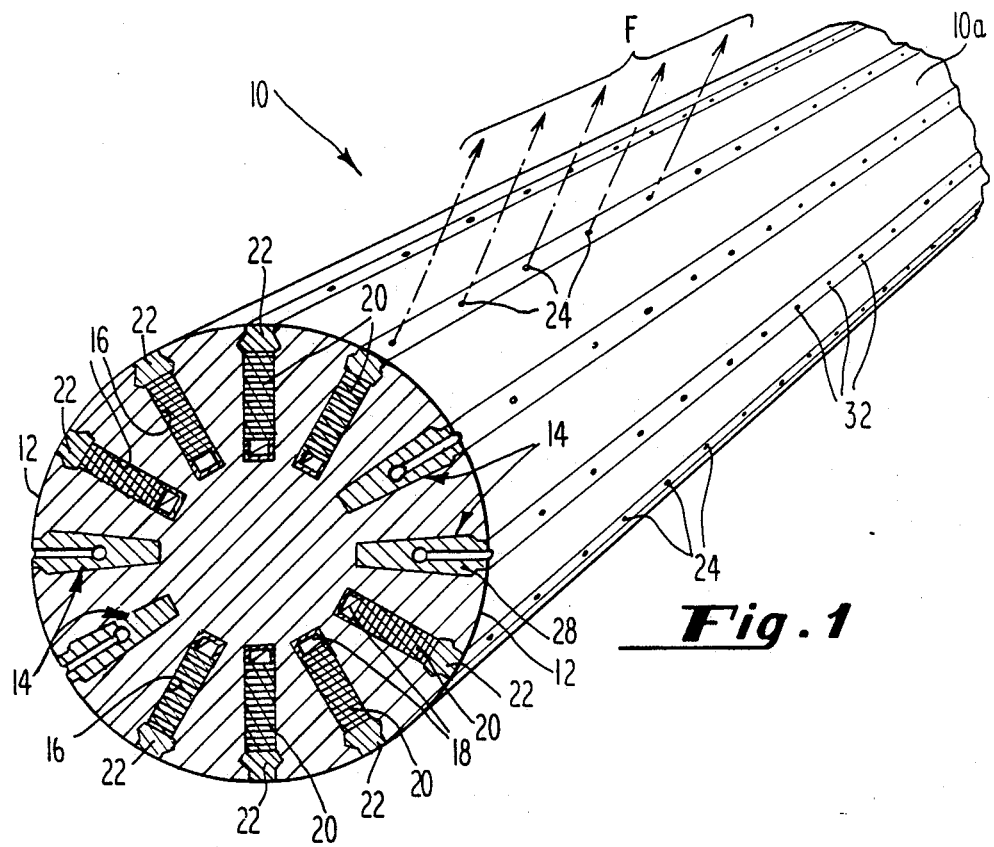
FIG. 1 illustrates a portion of a radially ventilated rotor which incorporates pole ventilation to reduce flow noise in accordance with the present invention.

Referring now to the drawings, wherein like characters designate like or corresponding parts throughout the several views, there is illustrated in FIG. 1 a typical radially ventilated rotor 10 which includes a plurality of pole regions 12 (two as shown). The term "pole region" as used herein refers to well known, otherwise continuous regions. In accordance with the present invention, each of the pole regions 12 is provided with means 14 for radially ventilating the pole region 12 such that noise which is induced by a flow F of fluid through the rotor 10 can be reduced.

As is well known, radially ventilated rotors, such as the rotor 10 shown in FIG. 1, are typically comprised of an outer body portion 10a within which is formed a plurality of longitudinal slots 16. Each of the slots 16 contain an axial ventilating channel 18, and slot contents 20 (which most often include a bottom spacer, an insulating slot cell adjacent the surface of the outer body portion 10a and the bottom spacer, a plurality of field winding conductors, a top spacer, and a damper bar). The slot contents 20, as is shown in FIG. 1, are maintained in place within the slot 16 by conventional means such as a wedge 22, and are cooled by the flow F of fluid through a plurality of ventilating slots 24 extending radially outward from the axial ventilating channels 18 to the exterior of the rotor 10. Further details relating to the construction of such a typical radially ventilated rotor 10 can be found in U.S. Pat. No. 4,508,985, and in U.S. Pat. No. 4,547,688, each of which is assigned to the assignee of the present invention and is incorporated herein by reference.

Figure 2:
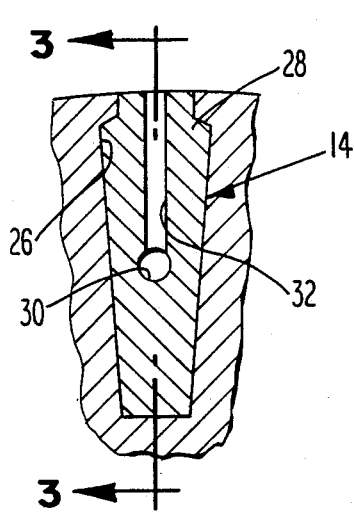
FIG. 2 shows an enlargement of the pole ventilation illustrated in FIG. 1.

As shown more clearly in FIG. 2, the means 14 for radially ventilating the pole region 12 of the rotor 10 is comprised generally of a slot 26 formed in the outer body portion 10a of the rotor 10 at its periphery, and an insert 28 which is adapted to be inserted within the slot 16, conforming with the surface of the outer body portion 10a at the periphery of the rotor 10. Each of the slots 26 may be formed in a similar manner as is used to form the slots 16, but in any case, the slots 26 have a predetermined cross-section corresponding to the cross-section of the insert 28.

Figure 3:
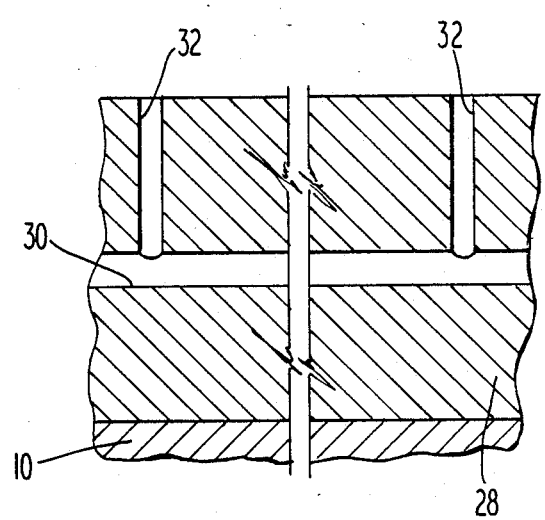
FIG. 3 is a sectional view of the pole ventilation shown in FIG. 2, taken along the lines 3—3.

Because the inserts 28 are adapted to be inserted within the pole regions 12 of the rotor 10, each of the inserts 28 are formed from a preselected magnetic material. One suitable such magnetic material is a magnetic steel, such as ASTM Standard A469, Class VII, although other magnetic materials may be used. The inserts 28 thus formed include a ventilation duct 30 within the insert 28 extending longitudinally thereof, and a plurality of ventilation holes 32, each of the ventilation holes 32 being connected to and extending radially outward from the ventilation duct 30 as is shown more clearly in FIG. 3.

By utilizing the same flow of cooling fluid F used to radially ventilate the slot contents 20 contained within the slots 16 formed in the rotor 10, introduced through the ventilating ducts 30 formed in each of the inserts 28, the pole regions 12 of the rotor 10 likewise provide a flow of the fluid F through the plurality of ventilating holes 32 formed in the inserts 28. Thus, the stationary parts of the dynamoelectric machine (not shown) within which the rotor 10 is incorporated will not experience the flow-no flow condition which induces undesirable noise in the manner as described herein above. Careful control of the flow F through the ventilating holes 32, by selecting a particular size of the ventilating holes 32 and a corresponding spacing between the ventilating holes 32 along a given insert 28, will therefore equalize the flow F about the circumference of the rotor 10 in order to prevent such an undesirable flow-no flow condition. For example, once it has been determined how much flow F is exiting the radially disposed slots 24, a given size of ventilating holes 32 may be selected with a corresponding spacing determined therebetween. If a relatively large size hole 32 is selected, the spacing between the holes 32 along a given insert 28 will be less than the spacing between the holes 32 in cases where a relatively smaller size hole 32 is selected.

Obviously, many modifications and variations are possible in light of the above teachings. It is therefore to be understood that, within the scope of the appended claims, the present invention may be practiced otherwise than as specifically described herein.

What I claim is:

1. A method of reducing noise produced by a radially ventilated rotor in a dynamoelectric machine, wherein the rotor includes two or more regions of a first type defined by a plurality of longitudinal slots each of which contain an axial ventilating channel, slot contents including a plurality of field winding conductors, and means for holding the slot contents within their respective slots, each of the slot contents and holding means having formed therein a plurality of radial ventilating slots in order to provide a flow of ventilating fluid through the slot contents and holding means between said channel and the exterior of said rotor, and wherein the rotor includes two or more regions of a second type each of which defines a pole region between adjacent pairs of the regions of the first type, said method comprising the steps of:

providing means for radially ventilating each of the pole regions;

providing a flow of fluid through said radially ventilating means, said flow of fluid through said radially ventilating means distributed uniformly about the rotor with respect to the flow of ventilating fluid through the slot contents and holding means between said channel and the exterior of said rotor;

wherein said step providing means for radially ventilating each of the pole regions comprises the steps of:

forming a plurality of slots in the rotor, each said slot having a predetermined cross-section extending longitudinally with respect to the rotor in a respective one of the pole regions;

providing an insert for each said slot, each said insert having a cross-section corresponding to said predetermined cross-section, and including means for circulating said flow of fluid therethrough; and inserting each said insert within its respective slot;

wherein said step providing said insert comprises the steps of:

forming said insert from a preselected magnetic material;

forming a ventilation duct within said insert extending longitudinally thereof;

forming a plurality of ventilation holes within said insert, each said ventilation hole connected to and extending radially outward from said ventilation duct.

2. The method according to claim 1, wherein said step forming said plurality of ventilation holes further comprises the steps of:

determining an amount of fluid flow from the radially ventilated rotor;

determining a distribution of sizes and spacings for said ventilation holes in order to equalize said determined amount of fluid flow;

selecting one of said sizes and its corresponding spacings;

forming each said ventilation hole of said selected size; and spacing said ventilation holes, each from the other along one of said inserts, by said spacing corresponding to said selected size.

3. A method of reducing noise in a dynamoelectric machine having a radially ventilated rotor comprised of an outer body portion having formed therein about its periphery a plurality of first regions having a plurality of longitudinal slots each of which contain an axial ventilating channel, slot contents including a bottom spacer, an insulating slot cell adjacent the surface of said body portion and said bottom spacer, a plurality of field winding conductors, top spacer, and damper bar, each of said slot contents having formed therein a plurality of radial ventilating slots in order to provide cooling paths between said channel and the exterior of the rotor, a plurality of second regions respectively defining a pole region formed upon said periphery between adjacent pairs of said first regions, wherein said noise is produced by said fluid flow through said cooling paths, said method comprising the steps of:

providing mean for radially ventilating each said pole region, comprising the steps of:

forming a plurality of slots in the rotor, each said slot having a predetermined cross-section longitudinally with respect to the rotor in a respective one of the pole regions;

providing an insert for each said slot, each said insert having a cross-section corresponding to said predetermined cross-section, and including means for circulating said fluid flow therethrough, wherein said step providing said insert comprises the steps of:

forming said insert from a preselected magnetic material;

forming a ventilation duct within said insert extending longitudinally thereof; and forming a plurality of ventilation holes within said insert, each said ventilation hole being connected to and extending radially outward from said ventilation duct; and inserting each said insert within its respective slot;

introducing said fluid flow through said means for radially ventilating each said pole region; and equalizing said fluid flow through each of said cooling paths with said fluid flow through each one of said plurality of ventilating holes in each said pole region.

4. The method according to claim 3, further comprising the step of cooling each said insert prior to said inserting step in order to shrink fit said insert within its respective slot.

5. An improved method of cooling a radially ventilated rotor in a dynamoelectric machine having a rotor comprised of an outer body portion having formed therein about its periphery a plurality of first regions having a plurality of longitudinal slots each of which contain an axial ventilating channel, slot contents including a plurality of field winding conductors, and a wedge to hold the slot contents within their respective slots, each of said slot contents having formed therein a plurality of radial ventilating slots in order to provide cooling paths for a fluid flow (F) between said channel and the exterior of said rotor, a plurality of second regions respectively defining a pole region formed upon said periphery between adjacent pairs of said first regions, said method comprising the steps of:

forming a plurality of slots in the rotor, each said slot having a predetermined cross-section extending longitudinally with respect to the rotor in a respective one of the pole regions;

providing a magnetic insert for each said slot, each said insert having a cross-section corresponding to the cross-section of its respective slot, and including means for circulating said flow of fluid therethrough;

cooling each said insert to temporarily shrink same;

inserting each said cooled insert within its respective slot; and allowing each said inserted insert to expand at ambient temperature within its respective slot, thereby wedging said insert tightly therein.

6. The method according to claim 5, further comprising the step of conforming an outer surface of each said insert to said periphery.

7. Apparatus for reducing noise produced by a radially ventilated rotor in a dynamoelectric machine, the rotor including a plurality of first regions which have a plurality of slots each containing slot contents including field winding conductors with a plurality of radial ventilating slots formed therein to provide a flow of fluid through the slot contents, and a plurality of second regions respectively defining a pole region between adjacent pairs of the first regions, comprising:

means for radially ventilating each of the pole regions; and means for providing a flow of fluid through said radially ventilating means;

wherein said means for radially ventilating each of the pole regions comprises:

a plurality of slots formed within the rotor, each said slot having a predetermined cross-section extending longitudinally with respect to the rotor in a respective one of the pole regions;

insert means for each said slot, each said insert means having a cross-section corresponding to said predetermined cross-section; and means for circulating said flow of fluid through said insert means; and wherein each said insert means comprises:

a member formed of a preselected magnetic material;

a ventilation duct formed within said member extending longitudinally thereof; and a plurality of ventilation holes formed within said member, each said ventilation hole connected to and extending radially outward from said ventilation duct, and adapted to provide a uniformity of flow between said flow of fluid through said insert means and the flow of fluid through the slot contents.

8. The apparatus according to claim 7, wherein each said ventilation hole comprises a selected size and spacing adapted to equalize a predetermined amount of fluid flow through said radially ventilated rotor.

9. In a dynamoelectric machine having a radially ventilated rotor comprised of an outer body portion having formed therein about its periphery a plurality of first regions having a plurality of longitudinal slots each of which contain an axial ventilating channel, slot contents including a bottom spacer, an insulating slot cell adjacent the surface of said body portion and said bottom spacer, a plurality of field winding conductors, top spacer, and damper bar, each of said slot contents having formed therein a plurality of radial ventilating slots in order to provide cooling paths between said channel and the exterior of said rotor, a plurality of second regions respectively defining a pole region formed upon said periphery between adjacent pairs of said first regions, apparatus for reducing noise produced by a fluid flow through said cooling paths comprising:

means for radially ventilating each said pole region, wherein said means for radially ventilating each of the pole regions comprises:

a plurality of slots in the rotor, each said slot extending longitudinally thereof in a respective one of the pole regions, and having a predetermined cross-section;

an insert for each said slot, each said insert having a cross-section corresponding to the cross-section of its respective slot, wherein each said insert comprises:

a member formed of a preselected magnetic material;

a ventilation duct formed within said member extending longitudinally thereof; and a plurality of ventilation holes formed within said member, each said ventilation hole being connected to and extending radially outward from said ventilation duct; and means for circulating said flow of fluid through each said insert within its respective slot; and means for equalizing said fluid flow through said cooling paths with a fluid flow through said means for radially ventilating each said pole region.

10. In a dynamoelectric machine having a radially ventilated rotor with an outer body portion having formed therein about its periphery a plurality of first regions with a plurality of longitudinal slots each of which contain an axial ventilating channel, slot contents including a bottom spacer, an insulating slot cell adjacent the surface of said body portion and said bottom spacer, a plurality of field winding conductors, top spacer, and damper bar, each of said slot contents having formed therein a plurality of radial ventilating slots in order to provide cooling paths adapted to receive a fluid flow between said channel and the exterior of said rotor, a plurality of second regions respectively defining a pole region formed upon said periphery between adjacent pairs of said first regions, wherein a presence of said flow through said cooling paths coupled with an absence of said fluid flow substantially across said pole regions produces a noise, improved apparatus for cooling said rotor without said noise comprising:

a plurality of slots formed in the rotor, each said slot extending longitudinally thereof in a respective one of said pole regions, and having a predetermined cross-section;

a member inserted within each said slot, each said member having a cross-section corresponding to the cross-section of its respective slot; and means for circulating said flow of fluid through each said member.

* * * * *